(12) United States Patent
Boxberg (10) Patent No.: US 11,108,286 B2
(45) Date of Patent: Aug. 31, 2021

(54) ELECTRICAL MACHINE HAVING COOLING FEATURES FORMED IN A STATOR WINDING

(71) Applicant: Trane International Inc., Davidson, NC (US)

(72) Inventor: Fredrik Boxberg, Espoo (FI)

(73) Assignee: Trane International Inc., Davidson, NC (US)

( * ) Notice: Subject to any disclaimer, the term of this patent is extended or adjusted under 35 U.S.C. 154(b) by 110 days.

(21) Appl. No.: 15/992,393

(22) Filed: May 30, 2018

(65) Prior Publication Data

US 2019/0372410 A1 Dec. 5, 2019

(51) Int. Cl.
| | |
|---|---|
| *H02K 1/20* | (2006.01) |
| *H02K 1/16* | (2006.01) |
| *H02K 15/12* | (2006.01) |
| *H02K 9/10* | (2006.01) |
| *H02K 15/02* | (2006.01) |
| *H02K 1/18* | (2006.01) |

(52) U.S. Cl.
CPC ............ *H02K 1/20* (2013.01); *H02K 1/16* (2013.01); *H02K 1/185* (2013.01); *H02K 9/10* (2013.01); *H02K 15/024* (2013.01); *H02K 15/12* (2013.01)

(58) Field of Classification Search
CPC ........................................................ H02K 1/20
USPC .................................................. 310/52–60 A
See application file for complete search history.

(56) References Cited

U.S. PATENT DOCUMENTS

| | | | |
|---|---|---|---|
| 2010/0026108 A1* | 2/2010 | Hassett | F28D 15/0275 310/54 |
| 2015/0091398 A1* | 4/2015 | Bradfield | H02K 9/19 310/54 |
| 2019/0222079 A1* | 7/2019 | Singhal | F01D 5/08 |

* cited by examiner

*Primary Examiner* — Quyen P Leung
*Assistant Examiner* — Minki Chang
(74) *Attorney, Agent, or Firm* — Taft Stettinius & Hollister LLP (57) ABSTRACT

An electrical machine has passages in the coil ends of a stator. The passages have an inlet port and an exit port disposed at different locations. The passages remove heat from the electrical machine during operation. The passages formed in the coil ends can receive a cooling fluid discharged from cooling passages formed in a stator core. Tooling can be used to form the passages. In some embodiments passages are also formed in the rotor. Other embodiments include apparatuses, systems, devices, hardware, methods, and combinations for electrical machines and the cooling of electrical machine rotors and/or stators.

24 Claims, 8 Drawing Sheets

ELECTRICAL MACHINE HAVING COOLING FEATURES FORMED IN A STATOR WINDING

TECHNICAL FIELD

The present invention relates to electrical machines having cooling features, and in particular, motors, generators and motor/generators having cooling features in the coil ends of the stator.

BACKGROUND

Electrical machines that have cooling features, and cooling features for electrical machines that effectively cool the electrical machines remain an area of interest. Some existing systems have various shortcomings, drawbacks, and disadvantages relative to certain applications. Accordingly, there remains a need for further contributions in this area of technology.

SUMMARY

One embodiment of the present invention is a unique electrical machine having passages in the coil ends of the stator, wherein the passages have an inlet port and an exit port disposed at different locations, and remove heat from the electrical machine during operation. Another embodiment is an electrical machine stator having passages that remove heat from an electrical machine during operation, and tooling that can be used to form the passages. Other embodiments include apparatuses, systems, devices, hardware, methods, and combinations for electrical machines and the cooling of electrical machine rotors and/or stators. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Embodiments of the present invention are directed to cooling features and schemes for cooling electrical machines, such as motors, generators and/or motor generators, all embodiments of which include cooling features of end windings of a stator. The present application includes features described in U.S. Pat. No. 9,680,351 to Boxberg et al. which is incorporated herein by reference in its entirety. In some, but not all embodiments, the electrical machines may be considered high-speed electrical machines. In some, but not all embodiments, the electrical machines may be induction machines or synchronous machines. The rotation of the electrical machine may be exploited for cooling in more than one manner, for example, by mounting a separate fan on the rotor shaft or by mounting or forming a conventional fan onto the rotor. However, such approaches may be cost prohibitive, and in the case of high-speed machines, may not be desirous, e.g., as they might generate more pressure or flow than is desired, or may experience more losses than are preferable, resulting in unnecessarily increased power requirements at the rotor.

In some embodiments of end winding cooling, cooling is additionally provided via the use of cooling passages in the rotor that effectively form a pump or compressor, e.g. an axial and/or centrifugal pump or compressor that induce flow through the rotor and in some embodiments, the stator as well. Some embodiments may generate lower pressures that are more suitable for high speed motors. The pressure may be easily adjusted in the manufacturing process of the rotor, e.g., by altering the positions of one or more openings in laminations in a laminated rotor that form the cooling passages in the rotor, or by altering the size of one or more of the openings to effectively function as an orifice to meter the flow of the cooling fluid (e.g., air). In some embodiments, the cooling scheme is symmetrical, e.g., wherein the cooling fluid flows in both directions, such as from each end to the opposite end of the rotor and/or stator, which in some embodiments may make the temperature distribution across the machine more homogeneous, and in some embodiments less power (pressure) may be needed for a desired volumetric flow of cooling fluid.

In some embodiments of end winding cooling, the stator, e.g., the stator core yoke, may also employ axial cooling channels extending therethrough. The cooling passages may be located near the stator slots so that the heat conduction distance is reduced. In some embodiments, the stator is laminated, and the cooling passages may be formed by forming openings in the laminations, and stacking the stator core in such a manner as to achieve the desired alignment between the openings to thereby form the cooling passages. In some embodiments, some of the openings in the laminations may be deflected or shifted relative to others, thereby forming turbulators that increase the heat transfer from the wall of the cooling passage to the cooling fluid.

Figure 1:
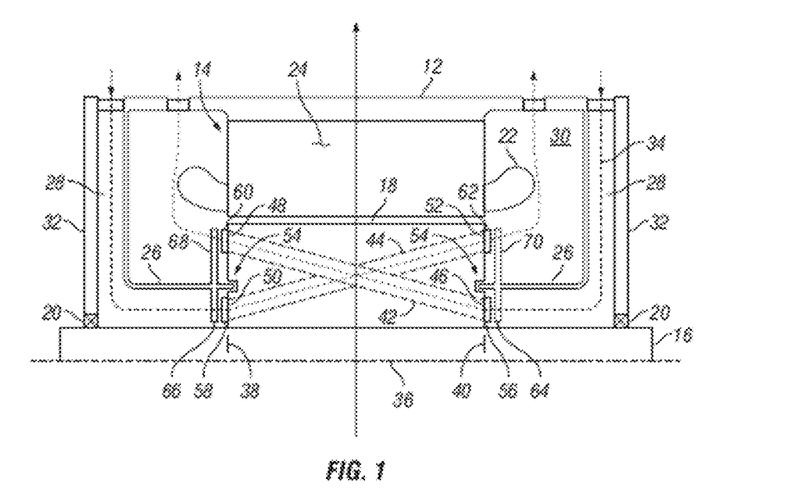
FIG. 1 schematically illustrates some aspects of a non-limiting example of an electrical machine.

Referring to the drawings, and in particular FIG. 1, some aspects of a non-limiting example of an electrical machine 10 are schematically depicted. In one form, electrical machine 10 is a motor. In other embodiments, electrical machine 10 may be a generator or may be a motor/generator. In one form, electrical machine 10 is an induction motor. In other embodiments, electrical machine 10 may be a synchronous machine. In still other embodiments, electrical machine 10 may take other forms. In one form, electrical machine 10 is a high-speed electrical machine. In other embodiments, electrical machine 10 may operate at any speed suitable for the particular application. Electrical machine 10 includes a casing 12, a stator 14, a shaft 16, rotor 18 and bearings 20. Casing 12 is configured to house stator 14, shaft 16, rotor 18 and bearings 20. In one form, bearings 20 are mounted in casing 12, e.g., an end plate of casing 12. In other embodiments, bearings 20 may be mounted and coupled to casing 12 via one or more other structures. Bearings 20 are structured to radially support rotor 18, and to react rotor 18 thrust loads.

Stator 14 includes a plurality of stator windings 22 and a stator core 24. Rotor 18 is disposed radially inward of stator core 24. In one form, stator 14 circumferentially encompasses rotor 18, although in other embodiments, stator 14 may only partially encompass induction rotor 18, e.g., in the form of segments disposed circumferentially around stator 14. Rotor 18 is configured for electromagnetic cooperation with stator 14, e.g., to convert electrical power into mechanical power for delivery via shaft 16 in some embodiments and/or to convert mechanical power received from shaft 16 into electrical power for delivery via stator 14 in other embodiments.

Disposed within casing 12 adjacent to rotor 18 are flow guides 26, which form cooling fluid supply passages 28 and cooling fluid exhaust passages 30. In the illustrated embodiment, cooling fluid supply passages 28 are formed between rotor 18, shaft 16, flow guides 26 and end plates 32; and cooling fluid exhaust passages 30 are formed between rotor 18, stator 14, flow guides 26 and casing 12. In other embodiments, cooling fluid supply passages 28 and cooling fluid exhaust passages 30 may be formed by one or more other components and/or disposed in one or more other locations. Cooling fluid supply passages 28 and cooling fluid exhaust passages 30 are operative to respectively supply and discharge the cooling fluid 34, e.g., air, to and from rotor 18 and electrical machine 10.

Figure 2:
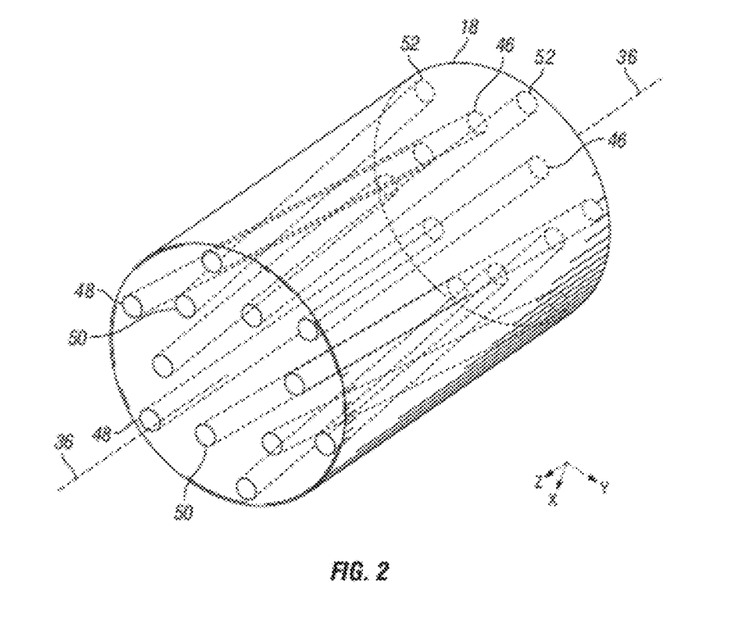
FIG. 2 schematically illustrates some aspects of a non-limiting example of the electrical machine rotor of FIG. 1.

Referring to FIG. 2 in conjunction with FIG. 1, some aspects of a non-limiting example of electrical machine 10 and rotor 18 are schematically depicted. Rotor 18 extends axially along an axis of rotation 36 about which rotor 18 and shaft 16 rotate, e.g., between an axial position 38 and an axial position 40. Rotor 18 includes a plurality of cooling passages 42 extending therethrough. In some embodiments, such as the embodiment depicted in FIGS. 1 and 2, rotor 18 also includes a plurality of passages 44 extending therethrough. In view of the following description, it will become apparent to those skilled in the art that cooling passages 42 and 44 remove heat from rotor 18 during operation of the electrical machine. Cooling passages 42 include cooling fluid inlet ports 46 and cooling fluid discharge ports 48; and cooling passages 44 include cooling fluid inlet ports 50 and cooling fluid discharge ports 52. Inlet ports 50 and discharge ports 48 are disposed at axial position 38, and inlet ports 46 and discharge ports 52 are disposed at axial position 40. It will be understood that embodiments of the present invention are not limited to cooling passages that extend only between the end faces of an electrical machine rotor. For example, in other embodiments, inlet ports 50 and discharge ports 48, and inlet ports 46 and discharge ports 52 may be disposed at any desired axial position. In addition, in some embodiments, the cooling passages may extend only from one portion to another portion of the electrical machine rotor, not necessarily through the entire axial length of the electrical machine rotor.

For each respective passage 42 and 44, discharge ports 48 and discharge ports 52 are disposed radially outward of inlet ports 46 and inlet ports 50. As a result of this outer radial displacement of discharge ports 48, 52 relative to inlet ports 46, 50, the rotation of rotor 18 generates centrifugal or centripetal forces on the cooling fluid 34 disposed within passages 42 and 44, These forces impart a radially outward velocity to the cooling fluid disposed within cooling passages 42 and 44, thus forming a centrifugal pump or compressor that generates a pressure rise between inlet ports 46, 50 and discharge ports 48, 52, thereby pumping cooling fluid through passages 42 and 44 from inlet ports 46, 50 to discharge ports 48, 52, and thus pumping the cooling fluid through cooling passages 42 and 44, and hence providing cooling to rotor 18.

Electrical machine 10 includes seals 54, which are configured to prevent or reduce the recirculation of fresh and exhausted cooling fluid between the inlet ports 46, 50 and discharge ports 48, 52 on rotor 18. In one form, seals 54 are labyrinth seals. In other embodiments, seals 54 may be any contacting or noncontacting seal or flow discourager. In one form, seals 54 include tips extending from flow guides 26 into a groove in rotor 18. In other embodiments, seals 54 may be formed with other geometries, and may not be incorporated as part of flow guides 26.

In some embodiments, for each respective passage 42 and 44, inlet ports 46, 50 may be disposed at different circumferential positions than discharge ports 48, 52, i.e., wherein during the rotation of rotor 18, discharge ports may lead or may lag the inlet ports, by which rotor 18 effectively functions as an axial pumps or compressor, e.g., in such a manner that a shrouded fan does so. This relative positioning of inlet ports 46, 50 and discharge ports 48, 52 may be employed to augment the pressure rise generated across rotor 18 during operation, or to reduce the pressure rise.

In some embodiments, inlet ports 46, 50 and discharge ports 48, 52 may be at the same radial position, but may be located at different circumferential positions such that rotor 18 functions purely as an axial flow machine. Thus in various embodiments, the inlet ports and discharge ports of the cooling passages may be located so that rotor 18 effectively functions as a centrifugal pump/compressor, an axial pumps/compressor, both an axial and centrifugal pump/compressor, or may position the inlet ports and discharge ports such that the pressure rise generated by centrifugal/centripetal effects are reduced by those generated by axial flow effects, or may position the inlet ports and discharge ports such that the pressure rise generated by centrifugal/centripetal effects are reduced by those generated by axial flow effects.

In one form, cooling passages 42 and 44 extend linearly between their respective inlet and discharge ports. In other embodiments, cooling passages 42 and 44 may be geometrically configured, arranged or disposed in any suitable fashion. For example, in some embodiments, substantially all of one or more of the cooling passages may be horizontal, e.g., maintaining the same radial position along the bulk of the length of rotor 18, but having the inlet ports and discharge ports located at the different radial and/or axial positions in order to achieve the desired pressure rise across the cooling passages to achieve the desired level of pumping of the cooling fluid. One form, cooling passages 42 and 44 have a relatively constant cross-section area or flow area between their respective inlet ports and discharge ports. In other embodiments, the cross-sectional area or flow area may vary between their respective inlet ports and discharge ports in accordance with the needs of the particular application. In one form, cooling passages 42 and 44 each have a single inlet port and a single discharge port. In other embodiments, cooling passages 42 and 44 may each have more than one inlet port and/or discharge port.

In some embodiments, rotating and/or stationary guide vanes may be employed, e.g., to augment, control, or fine-tune the flow through cooling passages 42 and 44. For example, in the embodiment of FIG. 1, electrical machine 10 includes rotating inlet guide vanes 56 and 58, e.g., extending from rotor 18; rotating discharge guide vanes 60 and 62, e.g. extending from rotor 18; stationery inlet guide vanes 64 and 66, extending from flow guides 26; and stationery discharge guide vanes 68 and 70, e.g. extending from flow guides 26. In various embodiments, electrical machine 10 may include one or more of rotating inlet guide vanes, stationery inlet guide vanes, rotating discharge guide vanes, and stationary discharge guide vanes. Although guide vanes 56, 58, 60, 62, 64, 66, 68 and 70 extend from respective rotor 18 and flow guides 26 in the illustrated embodiment, in other embodiments, the guide vanes may extend from, or be a part of, or be affixed to any suitable component.

In one form, the rotating and stationery inlet guide vanes are configured to direct cooling fluid into inlet ports 46 and 50 and to increase pressure in the cooling fluid in locations adjacent to inlet ports 46 and 50, in order to increase the flow of cooling fluid through passages 42 and 44, e.g., in a manner similar to compressor blades and vanes. The rotating and stationery discharge guide vanes are configured to decrease pressure in locations adjacent to discharge ports 48 and 52, in order to increase the amount of flow of cooling fluid through passages 42 and 44. For example, the discharge guide vanes may reduce discharge turbulence by shielding the discharge port from recirculation vortices and the like, and entrain the cooling fluid into the slipstream adjacent to the rotor, e.g., functioning in a manner similar to that of an ejector, for example, by generating a local rotating low pressure field at the locations of the discharge ports 48 and 52.

Figure 3:
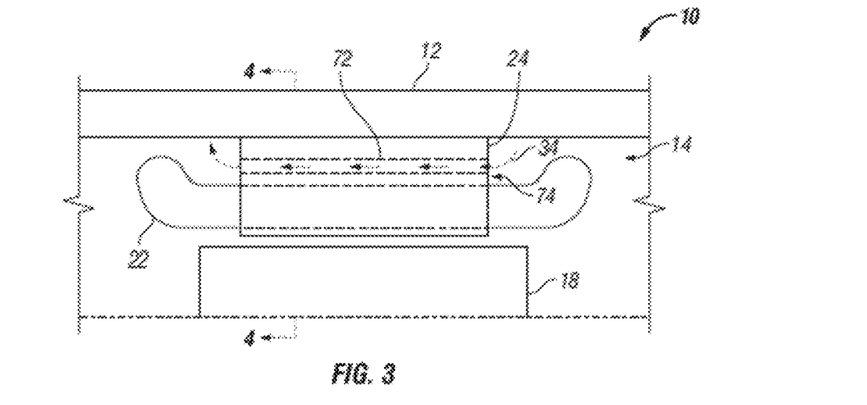
FIG. 3 schematically illustrates some aspects of a non-limiting example of an electrical machine stator.
Figure 4:
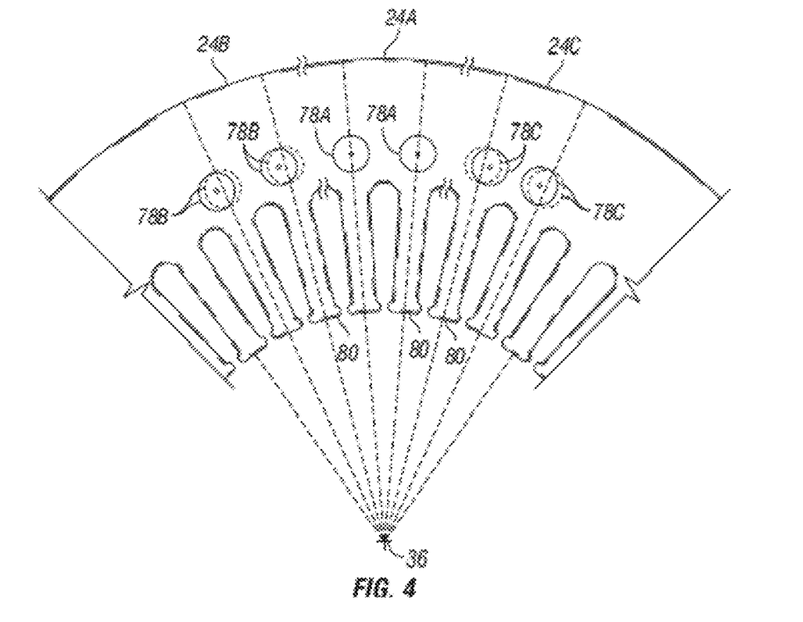
FIG. 4 schematically illustrates some examples of the formation of cooling passages of an electrical machine stator.
Figure 5:
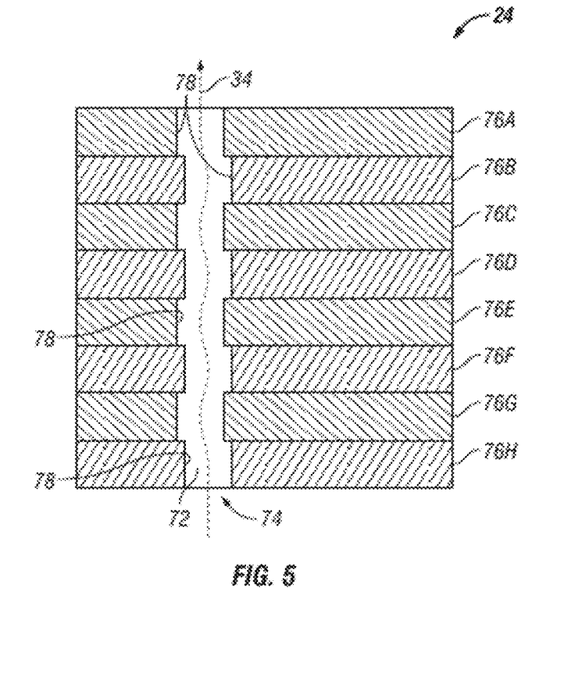
FIG. 5 schematically illustrates some aspects of a non-limiting example of a cooling passages of an electrical machine stator.
Figure 6:
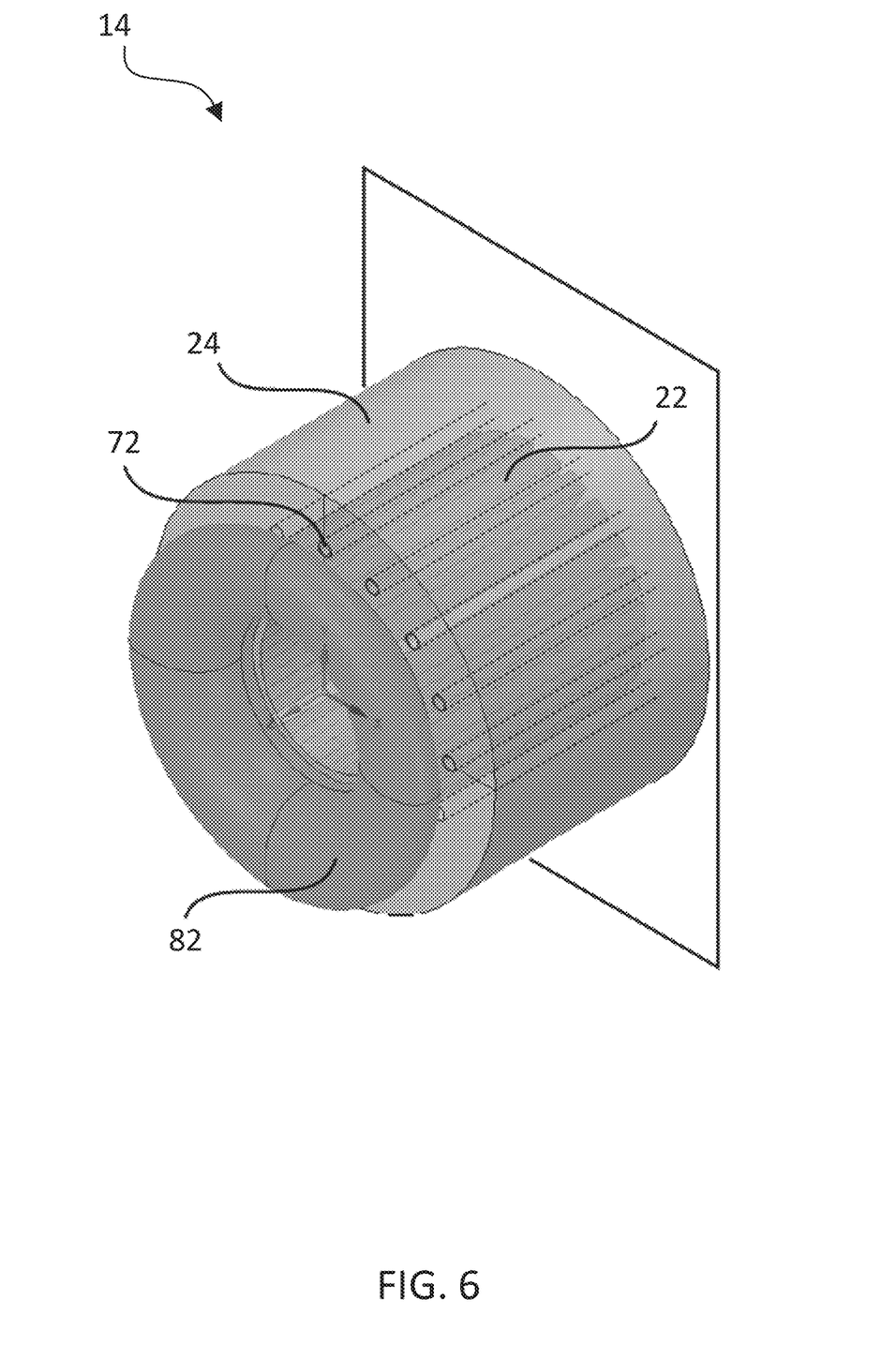
FIG. 6 schematically illustrates some aspects of a non-limiting example of a stator of an electrical machine stator.

Referring now to FIGS. 3-5, in some embodiments, stator 14, or more particularly, the stator core 24 or the stator core yoke of electrical machine 10, includes axial turbulated cooling passages 72 extending therethrough, for removing heat from stator core 24 during the operation of electrical machine 10 via the use of a cooling fluid, e.g., cooling fluid 34. For example, in some embodiments, discharge ports 48 and 52 are in fluid communication with cooling fluid inlet ports 74 of turbulated cooling passages 72, and provide a flow of cooling fluid 34 into and through turbulated cooling passages 72. In such embodiments, rotor 18 may be configured to provide cooling fluid 34 at a sufficient flow rate such that its temperature does not become undesirably high as it passes through rotor 18, hence allowing a desired amount of cooling of stator 14. In other embodiments, cooling fluid 34 may be cooled by a heat exchanger and/or one or more other heat absorbers prior to entry into turbulated cooling passages 72. In other embodiments, cooling fluid inlet ports 74 of turbulated cooling passages 72 may be in fluid communication with another source of pressurized cooling fluid in addition to or in place of cooling fluid pressurized by rotor 18.

In one form, turbulated cooling passages 72 are located near the stator slots, e.g., close to windings 22, so that the heat conduction distance is minimized. In one form, stator core 24 is formed of a plurality of laminations 76 that are stacked together, e.g., some of which are illustrated as laminations 76A-76H in FIG. 5. Openings in the laminations are aligned in a desired fashion to form the cooling passages through the cooling passages through the stator 24. In contrast to a smooth cooling passage, e.g., wherein the openings are substantially aligned, and wherein the alignment makes the cooling passage smooth, turbulated cooling passages 72 generate turbulence and increased convective heat transfer by misaligning at least some of the openings in the laminations so that turbulated cooling passages 72 are not smooth. For example, in various embodiments of the present invention, at least one or more openings 78 in laminations 76 are offset relative to other openings 78 in laminations 76 so as to form turbulated flow paths for the cooling fluid (i.e., turbulated cooling passages 72), which increases the convective heat transfer from the walls of the turbulated cooling passages 72 to cooling fluid 34.

Although it may be possible to form turbulators by inserting wire spirals or inserting or forming other features into smooth cooling passages in order to provide turbulation, such additional features may increase cost, for example by requiring additional components or requiring additional manufacturing steps and/or assembly steps. Thus, it is desirable to have a turbulated passage that does not require additional components, and to have methods of forming the cooling passages that have little or no effect on the time and cost of manufacturing the stator core 24.

High-speed electrical machines are smaller in size compared to standard 50/60 Hz machines with the same power level. As a consequence, powerful cooling is desirable in high-speed electrical machines, since the loss density is often much higher than in conventional electrical machines. Some high-speed electrical machines, e.g., 100-600 kW electrical motors, may be cooled from the outer surface of the housing enclosing the stator core, which requires that the heat be conducted, e.g., from the windings, through the core yoke, the core-housing shrink fit, and the housing. However, this may not be feasible in some high-speed machines, because the heat to be removed is too high relative to the heat path cross-sectional area, which in some cases can lead to overheating. Overheating is of particular concern regarding the stator windings, where increased temperatures have a detrimental effect on the effective life of the electrical machine.

FIG. 4 depicts 3 different examples of stator cores 24A, 24B and 24C for purposes of describing two methods of forming turbulated passages 72. The stator cores are formed as laminations stacked together in such a way as to form a cooling passage. Stator core 24A with openings 78A represents a case wherein all openings 78 are in substantial alignment with each other and with stator teeth 80, thus forming a non-turbulated (smooth) cooling passage. The openings 78A in each lamination maintain the same alignment relative to stator teeth 80 as the openings 78A in the other laminations and/or the laminations all face in the same direction.

Stator core 24B with openings 78B represent a methodology of forming turbulated cooling passages 72, wherein the openings 78B in the laminations 76 are all offset from alignment relative to the stator teeth 80, and all openings 78B have the same angular or positional offset from stator teeth 80, in which case turbulated cooling passages 72 are formed by facing at least one of the laminations in a direction opposite to at least another of the laminations. In the view depicted in FIG. 5, under the methodology employed with regard to openings 78B, every lamination faces in the opposite direction of an adjacent lamination. In other embodiments, only one or some laminations may face oppositely than others. The combination of the offset of the openings, and the fact that the laminations face in opposite directions, generates the turbulating features that render passages 72 to be turbulated cooling passages.

Stator core 24C with openings 78C represent a methodology of forming turbulated cooling passages 72, wherein two different lamination geometries are used, e.g., wherein one lamination geometric configuration employs openings having a first angular or positional relationship relative to stator teeth 80, and another lamination geometric configuration employs openings having a second angular or positional relationship relative to stator teeth 80 that is different from the first angular or positional relationship. In the depiction of FIG. 4, each pair openings 78C in the first lamination geometric configuration are offset from alignment with stator teeth 80 in a direction towards each other, whereas each pair of openings 78C in the second lamination geometric configuration are offset from alignment with stator teeth 80 in a direction away from each other. Stated differently, every first opening 78C, circumferentially, is rotated about axis of rotation 36 in one direction, e.g., clockwise, and every second opening, circumferentially, is rotated in the opposite direction, e.g., anti-clockwise or counter-clockwise. It will be understood that any suitable variation in angular or positional relationship of the openings relative to stator teeth 80 as between the two lamination geometries may be employed. In some embodiments, more than two different lamination geometric configurations may be employed. In the example depicted in FIG. 5, under the methodology employed with regard to openings 78C, every adjacent lamination faces in the same direction. The combination of two or more lamination geometric configurations having different offsets of the openings relative to stator teeth 80 generates the turbulated cooling passages 72.

With continuing reference to FIGS. 1-5, FIGS. 6-10 depict embodiments of a stator 14 including a stator core 24, stator windings 22, core passages which can take the form of cooling passages 72 (among others). FIGS. 7-10 depict end windings in the form of coil ends 82 of the stator 14 having end turn passages 84. Assembly tooling 86 is also disclosed which is useful to form end turn passages 84 in the coil ends 82. The stator core 24 depicted in FIGS. 7-10 can take on any of the various embodiments described above and in U.S. Pat. No. 9,680,351.

As will be appreciated in the discussion herein, the end turn passage 84 is defined between a number of conductor segments associated with one or more windings which make up the coil ends 82. A description of how to form the end turn passages 84 is provided further below. In one form the cooling path of the end coils 82 (i.e. the end turn passages 84) generally proceeds from an inlet side 88 to an exit side 90 without encountering a conductor segment of a winding which would block its path. For example, such a path can be formed through use of the assembly tool 86 which displaces the conductor segments to either side thus forming the wall portions of the cooling flow path. As used herein, use of the term "conductor segments" can include any constituent components of a winding, including the actual conductive element as well as any associated insulation, coatings, etc.

Figure 10:
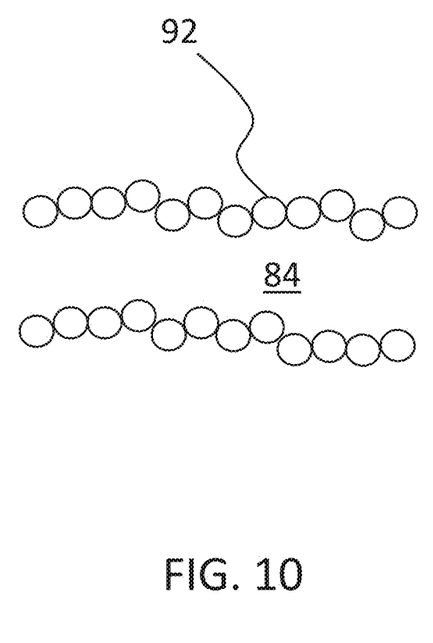
FIG. 10 schematically illustrates some aspects of a non-limiting example of a cooling passage formed by conductor segments of a coil end in an electrical machine stator.

FIG. 10 depicts one nonlimiting example of the walls of the cooling flow path 84 formed by conductor segments 92 used in the end coils 82. While the side walls of the cooling flow path in one form can be undulating in shape (corresponding to the outer surface of conductor segments successively stacked upon one another and/or the aggregate shape defined by the segments), the flow path itself will generally be unobstructed such as might occur with a conductor segment 92 that crosses the flow path and causing the cooling fluid to bifurcate/trifurcate/etc. In another alternative and/or additional embodiment, the cooling flow path 84 can include a line of sight from the inlet 88 to the outlet 90 of the cooling passage 84, regardless whether a conductor segment 92 crosses the flow path at some point along the length of the cooling passage 84. The cooling passage 84 can be formed along its length entirely from a common winding (e.g. a distinct winding associated with a particular phase), but in other forms the cooling passage 84 can be formed along its length by multiple windings.

The cooling passage 84 can take on any configuration such as cross sectional shape, longitudinal distribution of cross sectional shape, as well as in the axial and radial migration of the cooling passages, among any possible others. For example, the flow path 84 can extend parallel to a centerline axis of the stator core 24, but other forms may include a cooling flow path 84 that is formed at an angle to the centerline axis. In still further forms the cooling flow path 84 can be curved. Additionally and/or alternatively, the flow path 84 can have a cross sectional area that is different at the inlet 88 and the outlet 90, can vary along the length of the flow path 84 in any manner as it progresses from the inlet, and can have different shapes along the length, to set forth just a few nonlimiting examples. As will be appreciated from the discussion below, the shape of the cooling passage 84 can correspond to a tooling used to form the passages, or can correspond to the tooling along with any subsequent processing step that may alter such passage. Deformation or subsequent deformation steps coupled with impregnation and possibly curing processing may change the as formed shaped of the cooling passage 84. In one form of the present application it is contemplated that such changes do not close off the cooling passage such as to restrict the flow of coolant through the end turns 82.

The number of flow paths 84 and placement of associated inlets 88 can vary from embodiment to embodiment. In one form the number of flow paths 84 are equal to the number of cooling passages 72 formed in the stator core 24, but not all embodiments need include equal numbers. The inlets 88 of the flow paths 84 formed in the coil ends 82 can be aligned with the discharge of the cooling passages 72. Such alignment can be with respect to the radial and circumferential location of the discharge, but can also be with respect to a direction of fluid flow 98 that is emitted from the discharge (in cases where such discharge does not flow in a straight axial line). In some embodiments certain of the flow paths 84 can be in alignment with the discharge of certain cooling passages 72, while others of the flow paths 84 may not be in alignment with an associated cooling passage 72.

Figure 7:
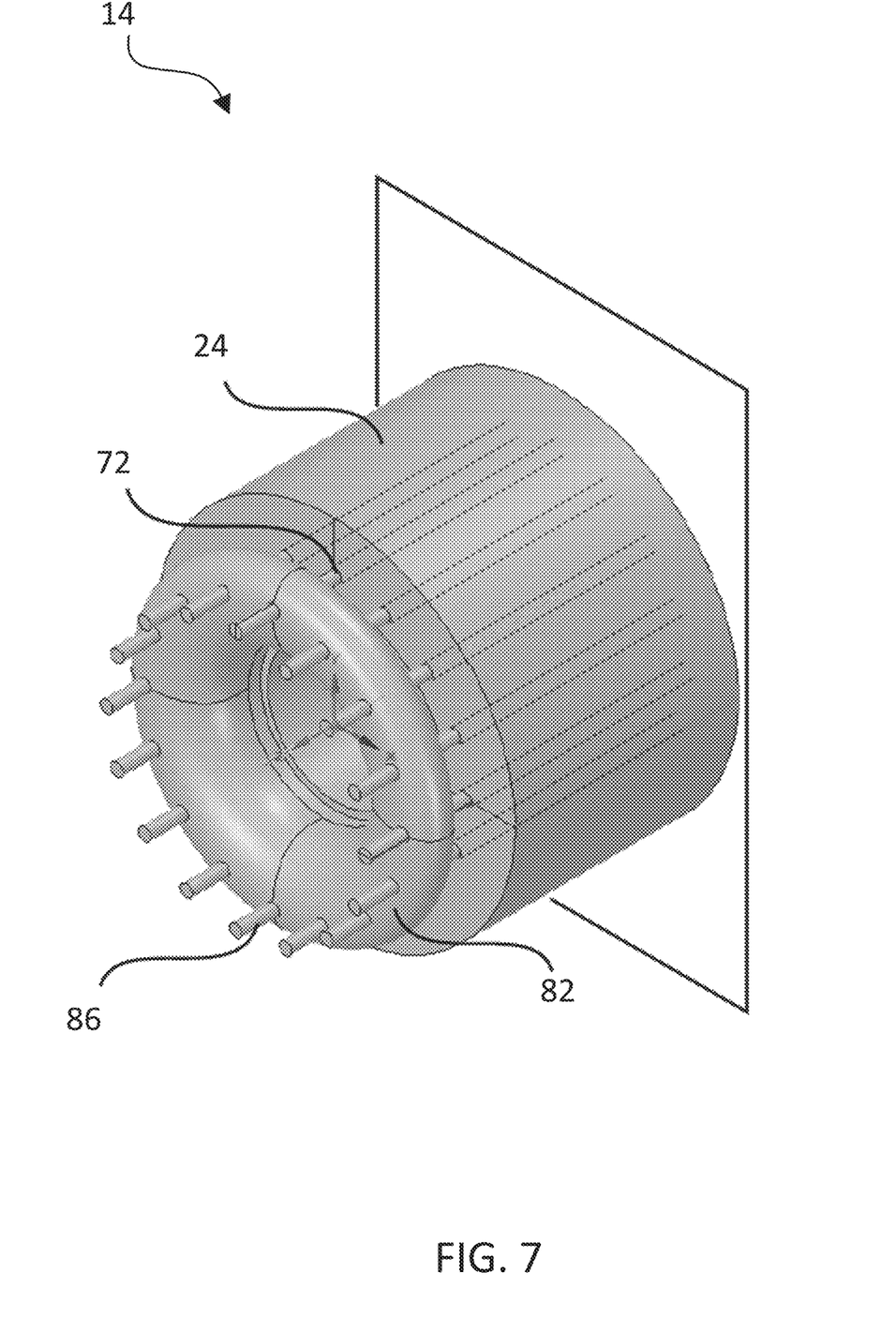
FIG. 7 schematically illustrates some aspects of a non-limiting example of a stator of an electrical machine stator which includes assembly tooling.
Figure 8:
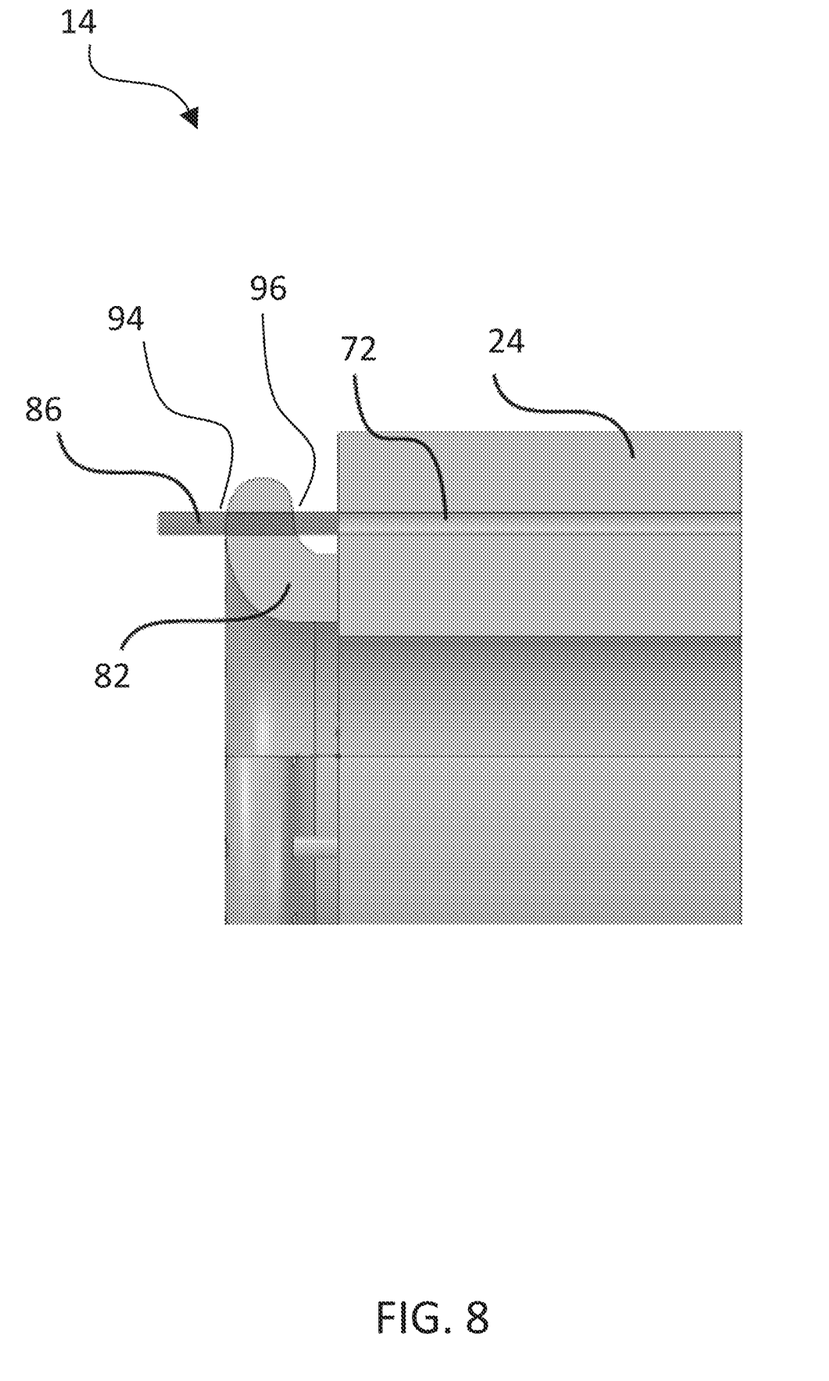
FIG. 8 schematically illustrates some aspects of a non-limiting example of a stator of an electrical machine stator which includes assembly tooling.
Figure 9:
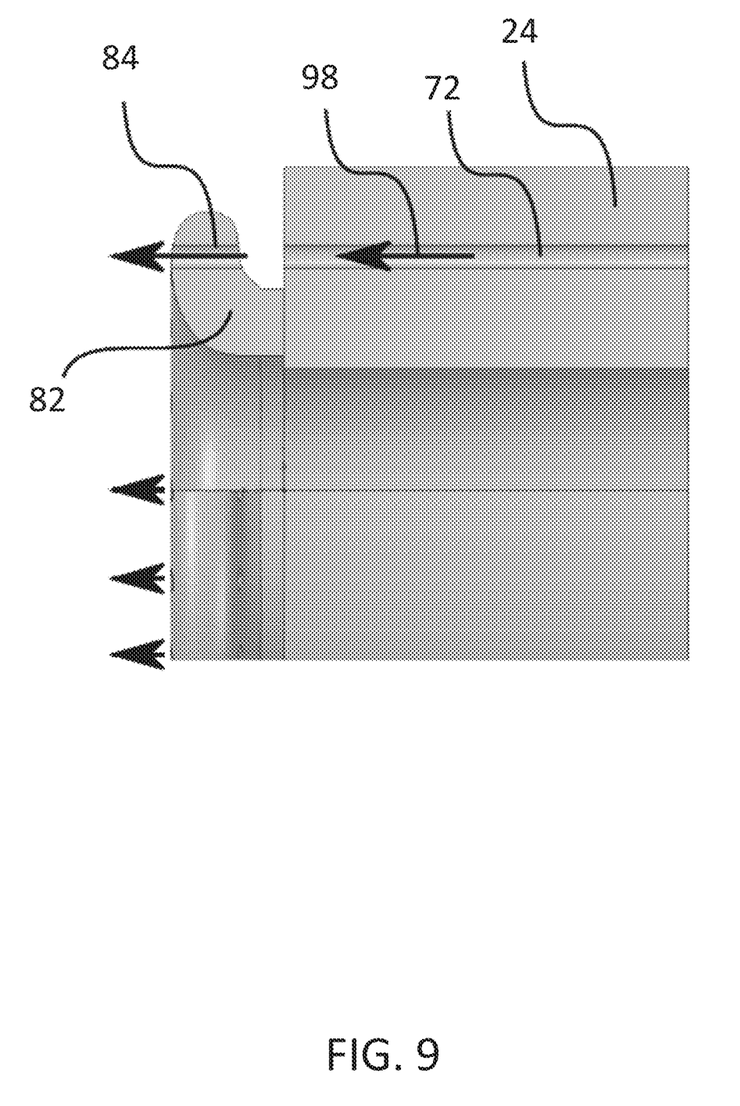
FIG. 9 schematically illustrates some aspects of a non-limiting example of cooling passages form in an electrical machine stator.

Turning now specifically a manner of making the flow paths 84, FIGS. 7-8 depict several views depicting assembly tooling 86 and its interaction with other components. The assembly tooling 86 can be placed to contact conductor segments 92 of a single winding to form the flow path 84, or can be placed to contact conductor segments in multiple windings. To set forth just a few nonlimiting examples, the tooling 86 can be interlaced between conductor segments 92 of the same winding, it can be placed between conductor segments of one winding and conductor segments of another winding, and can be interlaced within one winding and abut the outer segments of another winding, among potential other configurations. In short, given the number of conductor segments present in the end turns of any given stator core, the tooling can be placed between conductor segments of one or more distinct windings.

As will be appreciated, the number of steps useful to construct a finished stator can vary depending on the type of processed utilized. Some processes useful to form a finished stator will involve insertion of a winding into a slot between teeth 80 of a stator core 24, followed by one or more plastic deformations to the conductor segments 92 in the coil ends 82. As will be appreciated, a plastic deformation of a material includes situations in which the material is deflected past its linear range and into its plastic range such that a permanent deformation occurs. Such permanent deformation will include material region(s) in which the material has been plastically deformed whether or not the whole of the material is permanently deformed. The plastic deformation contemplated herein can include a portion or all of the material purposefully deformed to a desired shape, and in which the shape can be sustained in whole or in part when a loading force is removed from the material. It is contemplated that such shape which results from load removal can be sustained exactly how it appeared during application of the loading force, or can be sustained approximately similar to how it appeared during application of the force. In one form the tooling 86 can be positioned proximate the stator core 24 either before the stator core is wound or after the stator core is wound. The conductor segments can be subjected to the plastic deformation process either during the winding process or after the winding process. Pre-finished stator windings represent windings that have not been fully processed to form a finished stator-winding component, for example those involved in a process that includes first winding the stator then insertion of the assembly tooling 86 for plastic deformation of the coil ends 82. Additional manufacturing actions can be taken before the stator-winding component can be integrated into a finished electrical machine. Such actions can include also include impregnation of the windings using any suitable material and any suitable process. In one form the impregnation step can be performed prior to plastic deformation of the winding. Impregnation can use any suitable material, for example resins or varnishes among potential others. Various types of impregnation are contemplated herein such as trickling, vacuum impregnation, roll dipping, hot dipping, and vertical dipping, among potential others. Process such as UV curing and thermosetting (among potential others) are also contemplated herein. Curing can also occur either before or after the plastic deformation. As will be appreciated, therefore, the plastic deformation process may be the final step in a manufacturing process in the formation of finished stator windings, or can be an intermediate step which is used in conjunction with other steps in the formation of finished stator windings.

In some embodiments the assembly tooling 86 can be coupled to the stator core 24 to provide no relative movement between the cooling fluid ports and the assembly tooling. Such coupling can include insertion of the tooling 86 into the cooling passages 72, affixation of the tooling 86 to the stator end face, etc. In other potential forms the assembly tooling can include a jig and/or fixture which may permit relative movement with the stator core but otherwise still in a manner consistent with forming cooling pathways in a final processed form of the stator-winding component. In some forms the stator core could be considered the jig and/or fixture.

The assembly tooling 86 can take on any variety of forms and have any number of components. In one form the assembly tooling can be a plug, pipe, bar, or rod, where such form can be solid or hollow. Such plug, pipe, bar, or rod can take on any shape, size, and configuration useful to form the cooling passages 84. The assembly tooling can be connected directly to the stator core 24 or may be offset from an end of the core 24. In another form a hollow component (such as a hollow plug, pipe, bar, or rod) can be inserted into the cooling path after the assembly tooling has been withdrawn from the coil ends 82 after formation of the cooling path 84, where the internal hollow cavity of such component can be used to form the cooling flow path 84. It will be appreciated that the assembly tooling 86 generally includes a configuration (e.g. geometry, material composition, etc) that is structurally sufficient to aid in the plastic deformation of the pre-finished windings during formation of the cooling passages 84. In one form the assembly tooling 86 can be made of a heat resistant material (e.g. silicone). Such material robustness can be useful during any one or more processes involved in forming a finished stator, including the deformation, impregnation, curing, and assembly tool removal process. To set forth just one non-limiting example, the assembly tooling 86 can be retained in place proximate the core during the impregnation process, but removed afterwards. In some forms the assembly tooling 86 can be permanently retained such as when the assembly tooling 86 is hollow. The structural sufficiency of the assembly tooling can include a structurally robust tooling 86 which resists all imposed loads within the linear range of the material, but in some forms may also permit some plastic deformation of the tooling as well, so long as the cooling passages 84 are formed in a manner consistent to permit cooling fluid to flow therethrough. Such fluid flowing through cooling passage 84 can be received from passages 72 or from any other suitable source.

The line of sight discussed above in one embodiment of the passages 84 can be formed from assembly tooling 86 that itself includes a line between a first portion 94 that corresponds to an exit of the to-be-formed cooling path, and a second portion 96 that corresponds to an inlet of the to-be-formed cooling path. For example, the assembly tool can include a line that connects the first portion 94 with the second portion 96, where the line remains within or on the surface of the material of the assembly tool 86. In other forms the line of sight might be formed by subsequent deformation actions after an initial deformation of the conductor segments against the assembly tool.

One aspect of the present application includes an apparatus comprising a stator core structured for assembly into an electric machine and having a plurality of inward projecting teeth between which are formed a plurality of winding slots, a cooling fluid supply passage extending through the stator core and having a first cooling fluid port at a first axial location of the stator core, the first cooling fluid port configured to discharge a cooling fluid therethrough, a plurality of stator windings that each includes a plurality of loops of a conductor, each of the plurality of stator windings including opposing segments structured for insertion into the plurality of winding slots as well as a first end turn segment and a second end turn segment, and an assembly tooling positioned between conductor end turn segments and having a geometric configuration and structural strength to form a cooling fluid pathway between the conductor end turn segments when the conductor end turn segments are subjected to a plastic deformation action used in the formation of finished stator windings.

A feature of the present application includes wherein the assembly tooling is in the form of an elongate rod.

Another feature of the present application includes wherein the assembly tooling includes a plurality of elongate rods, wherein the cooling fluid supply passage includes a plurality of cooling fluid supply passages each having a first cooling fluid port, and wherein the plurality of elongate rods are positioned proximate corresponding ones of the first cooling fluid ports.

Still another feature of the present application includes wherein the number of plurality of elongate rods is the same as the number of cooling fluid supply passages.

Yet another feature of the present application includes wherein the assembly tooling is positioned in line with the first cooling fluid port such that fluid discharged from the first cooling fluid port is directed toward the cooling fluid pathway after the conductor end turn segments are subjected to a plastic deformation action used in the formation of finished stator windings.

Still yet another feature of the present application includes wherein the assembly tooling extends along a straight line between a portion of the assembly tooling used to form an inlet to the cooling fluid pathway and a portion of the assembly tooling used to form an outlet to the cooling fluid pathway, the straight line residing entirely within the interior of the assembly tooling.

Yet still another feature of the present application includes wherein the assembly tooling includes an interior opening structured to pass a cooling fluid, and wherein the assembly tooling is affixed to the stator core such that a finished component which includes the stator core and finished windings includes the assembly tooling with open interior.

A further feature of the present application includes wherein the assembly tool includes a rod affixed to a jig.

Another aspect of the present application includes an apparatus comprising an electrical machine stator including a stator core and a plurality of winding end turns, the stator core including a cooling fluid supply passage extending therethrough and a first cooling fluid port structured to discharge a cooling fluid from an end of the stator core, the plurality of winding end turns including a cooling passage therethrough that extends from a first side to a second side and structured to pass a cooling fluid when the electrical machine stator is incorporated into electrical machine and the electrical machine is in an operating condition, the cooling passage of the plurality of end turns defined by a plastic deformation of winding conductor segments, the cooling passage having a line of sight from the first side to the second side.

A feature of the present application includes wherein the cooling passage of the plurality of winding end turns positioned proximate with the cooling fluid supply passage of the stator core.

Another feature of the present application includes wherein the stator core includes a plurality of cooling fluid supply passages and the plurality of winding end turns include a plurality of cooling passages.

Still another feature of the present application includes wherein an inlet of the cooling passage is radially and circumferentially coincident with the first cooling fluid port of the stator core, and wherein the plurality of winding end turns are impregnated.

Yet another feature of the present application further includes a hollow pipe disposed in the cooling passage.

Still yet another feature of the present application further includes an electrical machine rotor coupled with the electrical machine stator to form an electrical machine, wherein the stator core includes a plurality of cooling fluid supply passages and the plurality of winding end turns include a plurality of cooling passages, and wherein the number of cooling passages is the same as the number of cooling fluid supply passages.

Yet still another feature of the present application includes wherein the electrical machine stator further including an assembly tooling that extends through the cooling passage.

A further feature of the present application includes wherein the assembly tooling includes an internal passage.

A yet further feature of the present application includes wherein the assembly tooling is in the form of a pipe inserted through the cooling passage, the pipe having an internal passage configured to convey cooling fluid therethrough and structured to remain with the stator core when the stator core is integrated with an electrical machine rotor.

Yet another aspect of the present application includes a method comprising during manufacture of an electrical machine stator, locating a plurality of stator windings in proximity to a plurality of winding slots of a stator core such that an end turn is formed relative to the stator core, positioning an assembly tool between conductor segments of the end turn, plastically deforming the conductor segments against the assembly tool, and forming a cooling passage through the end turn.

A feature of the present application further includes withdrawing the assembly tool from the end turn.

Another feature of the present application further includes positioning the assembly tool into a cooling passage of the stator core.

Still another feature of the present application further includes impregnating the plurality of stator windings.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore, it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An apparatus comprising:
    a stator core structured for assembly into an electric machine and having a plurality of inward projecting teeth between which are formed a plurality of winding slots;
    a cooling fluid passage extending through the stator core, the cooling fluid passage extending from a first axial end of the stator core to a second axial end of the stator core opposite the first axial end, the cooling fluid passage having a first cooling fluid port at the first axial end of the stator core and a second cooling fluid port at the second axial end of the stator core, the first cooling fluid port configured to discharge a cooling fluid therethrough and the second cooling fluid port configured to receive an incoming flow of cooling fluid;
    a plurality of stator windings that each includes a plurality of loops of a conductor, each of the plurality of stator windings including opposing segments structured for insertion into the plurality of winding slots as well as a first end coil positioned at the first axial end of the stator core and having a first end turn segment, and a second end coil positioned at the second axial end of the stator core and having a second end turn segment; and
    a cooling fluid flow path defined through an interior passage of the first end coil, through the cooling fluid passage, and through an interior passage of the second end coil, the cooling fluid flow path starting from the interior passage of the second end coil, to the second cooling fluid port of the stator, through the cooling fluid passage of the stator core, to the first cooling fluid port of the stator, and through the interior passage of the first end coil.

2. The apparatus of claim 1, which further includes an assembly tooling positioned between conductor end turn segments and having a geometric configuration and structural strength to form a cooling fluid pathway between the conductor end turn segments when the conductor end turn segments are subjected to a plastic deformation action used in the formation of finished stator windings, wherein the assembly tooling is in the form of an elongate rod.

3. The apparatus of claim 2, wherein the assembly tooling includes a plurality of elongate rods, wherein the cooling fluid passage includes a plurality of cooling fluid passages each having a first cooling fluid port, and wherein the plurality of elongate rods are positioned proximate corresponding ones of the first cooling fluid ports.

4. The apparatus of claim 3, wherein the number of plurality of elongate rods is the same as the number of cooling fluid passages.

5. The apparatus of claim 2, wherein the assembly tooling is positioned in line with the first cooling fluid port such that fluid discharged from the first cooling fluid port is directed toward the cooling fluid pathway after the conductor end turn segments are subjected to a plastic deformation action used in the formation of finished stator windings.

6. The apparatus of claim 2, wherein the assembly tooling extends along a straight line between a portion of the assembly tooling used to form an inlet to the cooling fluid pathway and a portion of the assembly tooling used to form an outlet to the cooling fluid pathway, the straight line residing entirely within the interior of the assembly tooling.

7. The apparatus of claim 6, wherein the assembly tooling includes an interior opening structured to form the cooling fluid flow path and to pass a cooling fluid, and wherein the assembly tooling is affixed to the stator core such that a finished component which includes the stator core and finished windings includes the assembly tooling with open interior.

8. The apparatus of claim 6, wherein the assembly tool includes a rod affixed to a jig.

9. The apparatus of claim 1, wherein the interior passage of the second end coil extends from a first side of the second end coil facing the stator core to a second side of the second end coil opposite the first side of the second end coil and facing away from the stator core, the interior passage including a line of sight from the first side of the second end coil to the second side of the second end coil.

10. An apparatus comprising:
    an electrical machine stator including a stator core and a plurality of winding end turns, the stator core including a cooling fluid passage extending therethrough from a first axial end of the stator core to a second axial end of the stator core, the cooling fluid passage having a first cooling fluid port structured to discharge a cooling fluid from the first axial end of the stator core, the plurality of winding end turns including a first plurality of winding end turns at the first axial end of the stator core, the first plurality of winding end turns having a first cooling passage therethrough that extends from a first side of the first plurality of winding end turns to a second side of the first plurality of winding end turns opposite the first side of the first plurality of winding end turns, the plurality of winding end turns also including a second plurality of winding end turns at the second axial end of the stator core, the second plurality of winding end turns having a second cooling passage therethrough that extends from a first side of the second plurality of winding end turns to a second side of the second plurality of winding end turns opposite the first side of the second plurality of winding end turns, the first cooling passage and the second cooling passage structured to pass a cooling fluid when the electrical machine stator is incorporated into electrical machine and the electrical machine is in an operating condition, the first cooling passage and the second cooling passage defined by a plastic deformation of winding conductor segments, the first cooling passage having a line of sight from the first side of the first plurality of winding end turns to the second side of the first plurality of winding end turns, the second cooling passage having a line of sight from the first side of the second plurality of winding end turns to the second side of the second plurality of winding end turns, wherein an integrated cooling fluid flow path is formed through an interior passage of the first plurality of winding end turns, through the cooling fluid passage of the stator core, and through an interior passage of the second plurality of winding end turns, the integrated cooling fluid flow path starting from the interior passage of the first plurality of winding end turns, to the cooling fluid passage, and through the interior passage of the second plurality of winding end turns.

11. The apparatus of claim 10, wherein the first cooling passage of the plurality of winding end turns positioned proximate with the cooling fluid passage of the stator core.

12. The apparatus of claim 11, wherein the stator core includes a plurality of cooling fluid passages and the plurality of winding end turns include a plurality of first cooling passages.

13. The apparatus of claim 11, wherein an inlet of the first cooling passage is radially and circumferentially coincident with the first cooling fluid port of the stator core, and wherein the plurality of winding end turns are impregnated.

14. The apparatus of claim 13, which further includes a hollow pipe disposed in the first cooling passage.

15. The apparatus of claim 13, which further includes an electrical machine rotor coupled with the electrical machine stator to form an electrical machine, wherein the stator core includes a plurality of cooling fluid passages and the plurality of winding end turns include a plurality of first cooling passages, and wherein the number of first cooling passages is the same as the number of cooling fluid passages.

16. The apparatus of claim 10, wherein the electrical machine stator further including an assembly tooling that extends through the first cooling passage.

17. The apparatus of claim 16, wherein the assembly tooling includes an internal passage.

18. The apparatus of claim 17, wherein the assembly tooling is in the form of a pipe inserted through the first cooling passage, the pipe having an internal passage configured to convey cooling fluid therethrough and structured to remain with the stator core when the stator core is integrated with an electrical machine rotor.

19. The apparatus of claim 10, wherein the cooling fluid passage also includes a second cooling fluid port structured to receive the cooling fluid into the second end of the stator core, and wherein a cooling fluid flowpath extends through the second cooling passage, into the second cooling fluid port, through the cooling fluid passage, out the first cooling fluid port, and into the first cooling passage.

20. A method comprising:
   during manufacture of an electrical machine stator, locating a plurality of stator windings in proximity to a plurality of winding slots of a stator core such that a first end turn is formed at a first axial end of the stator core and a second end turn is formed at a second axial end of the stator core, the stator core having a cooling fluid passage that extends from the first axial end to the second axial end;
   positioning a first assembly tool between conductor segments of the first end turn and a second assembly tool between conductor segments of the second end turn;
   aligning the first assembly tool with the cooling fluid passage and aligning the second assembly tool with the cooling fluid passage;
   plastically deforming the conductor segments of the first end turn against the first assembly tool and conductor segments of the second end turn against the second assembly tool; and
   forming a first cooling passage through the first end turn and a first cooling passage through the first end turn as a result of the plastically deforming, the first cooling passage in fluid communication with the second cooling passage.

21. The method of claim 20, which further includes withdrawing the assembly tool from the end turn.

22. The method of claim 20, which further includes positioning the assembly tool into a cooling passage of the stator core.

23. The method of claim 20, which further includes impregnating the plurality of stator windings.

24. The method of claim 20, wherein the aligning includes positioning a first end of the first assembly tool at an opening of the cooling fluid passage located at the first axial end and positioning a first end of the second assembly tool at an opening of the cooling fluid passage located at the second axial end.

* * * * *